United States Patent [19]

Durfee et al.

[11] Patent Number: 5,436,308
[45] Date of Patent: Jul. 25, 1995

[54] CROSS-LINKED ORGANOFUNCTIONAL POLYSILOXANES AND METHOD FOR PREPARATION

[75] Inventors: Loren D. Durfee, Midland; Robin S. Asch, Beaverton, both of Mich.

[73] Assignee: Dow Corning Corporation, Midland, Mich.

[21] Appl. No.: 893,147

[22] Filed: Jun. 3, 1992

[51] Int. Cl.$^6$ .............................................. C08G 77/06
[52] U.S. Cl. ...................................... 528/15; 528/25; 528/31; 525/478
[58] Field of Search .................... 528/15, 25, 31; 525/478

[56] References Cited

U.S. PATENT DOCUMENTS

| | | | |
|---|---|---|---|
| 2,851,473 | 9/1958 | Wagner | 260/148.2 |
| 3,159,662 | 12/1964 | Ashby | 260/448.2 |
| 3,440,263 | 4/1969 | Brennan | 260/448.2 |
| 3,440,263 | 4/1969 | Brennan | 260/448.2 |
| 4,166,078 | 8/1979 | Betson | 528/26 |

FOREIGN PATENT DOCUMENTS

| | | |
|---|---|---|
| 2166867 | 4/1976 | Germany . |
| 1104206 | 2/1968 | United Kingdom . |

*Primary Examiner*—John C. Bleutge
*Assistant Examiner*—Margaret W. Glass
*Attorney, Agent, or Firm*—William F. Boley

[57] ABSTRACT

The present invention is novel organofunctional polysiloxane and organofunctional cyclosiloxane compositions and a process for their preparation. The process for preparation of these siloxane compositions comprises contacting a mixture containing a cyclo(organohydrogen)siloxane or a poly(organohydrogen)siloxane, a mono-α-olefin, and a α,Ω-triene with a platinum catalyst, at a temperature within a range of 50° C. to 200° C. The products of this process are cross-linked organofunctional polysiloxanes and cross-linked organofunctional cyclosiloxanes.

30 Claims, No Drawings

CROSS-LINKED ORGANOFUNCTIONAL POLYSILOXANES AND METHOD FOR PREPARATION

BACKGROUND OF INVENTION

The present invention is cross-linked novel organofunctional polysiloxane and organofunctional cyclosiloxane compositions and a process for their preparation. The process for preparation of these siloxane compositions comprises contacting a mixture containing a cyclo(organohydrogen)siloxane or a poly(organohydrogen)siloxane, a mono-α-olefin, and a alpha,omega-triene, with a platinum catalyst, at a temperature within a range of 50° C. to 200° C. The products of this process are cross-linked organofunctional polysiloxanes and cross-linked organofunctional cyclosiloxanes.

The reaction of olefins with SiH-containing compounds is well known. For example, Wagner et al., U.S. Pat. No. 2,851,473, issued Sept. 9, 1958, describe the use of platinum deposited on the gamma allotrope of alumina to catalyze the reaction between, molecules containing C=C bonds and SiH containing monomers.

British Pat. No. 1,104,206, published Feb. 21, 1968, describes a process where a silicon compound containing at least one silicon-bonded hydrogen atom per molecule and not more than two hydrogen atoms attached to any one silicon atom is reacted with a compound containing aliphatically unsaturated carbon atoms in the presence of a platinum complex. Specific examples of compounds containing aliphatically unsaturated carbon atoms include compounds containing one end two unsaturated bonds.

German Patent Application No. P-2,166,867.7, published Apr. 22, 1976, describes a process where the reaction of trichlorosilane or methyldichlorosilane width a triene is catalyzed with platinum compounds to form bis-silyl olefins. The bis-silyl olefins are further reacted with polymeric unsaturated hydrocarbon chains in the presence of a Lewis acid and a metethesis catalyst to form polymeric hydrocarbons with reactive silyl terminal groups.

Brennan, U.S. Pat. No. 3,440,263, issued Apr. 22, 1969, describes a process in which olefinic compounds containing a least one ethylenic bond is reacted with a siloxane polymer containing SiH bonds to form alkylated siloxanes. Platinum or platinum compounds supported on charcoal were reported as a suitable catalyst for the process.

Getson, U.S. Pat. No. 166,078, issued Aug. 28, 1979, describes a process where a modified organopolysiloxane composition containing in situ generated particulate matter is prepared by reacting an organohydrogenpolysiloxane with monomers containing aliphatic unsaturation in the presence of free radical initiators. Getson further describes a process where the modified organopolysiloxane composition is reacted with a compound having at least two vinyl groups per molecule as a cross-linking agent and a catalyst which promotes the addition of SiH groups present in the modified organopolysiloxane composition to vinyl groups of the cross-linking agent. Platinum is described as a suitable catalyst for the cross-linking process.

The object of the present invention is to provide a process for the production of organofunctional siloxane compositions with enhanced compatibility with organic compositions. The substitution of mono-α-olefin for hydrogen on the silicon atoms of the siloxane can be used to control the organic compatibility of the siloxane, while the substitution of alpha,omega-trienes (α,Ω-triene) for hydrogen on the silicon atoms of the siloxane can be used to crosslink the siloxanes. The internal unsaturated bond of the α,Ω-triene is not effected by the platinum catalyst and thus remains intact imparting an organofunctionality to the siloxane compositions.

SUMMARY OF INVENTION

The present invention is novel organofunctional polysiloxane and organofunctional cyclosiloxane compositions and a process for their preparation. The process for preparation of these siloxane compositions comprises contacting a mixture containing a cyclo(organohydrogen) siloxane or a poly(organohydrogen)siloxane, a mono-α-olefin, and a α,Ω-triene with a platinum catalyst, at a temperature within a range of 50° C. to 200° C. The products of this process are cross-linked organofunctional polysiloxanes and cross-linked organofunctional cyclosiloxanes.

DESCRIPTION OF INVENTION

The present invention is novel organofunctional polysiloxane and organofunctional cyclosiloxane compositions and a process for their preparation. The process comprises:

(A) contacting a mixture comprising a poly(organohydrogen) siloxane described by formula $$R_3SiO(R_2SiO)_p(RHSiO)_qSiR_3, \text{ or} \quad (1)$$ 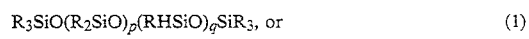

a cyclo(organohydrogen)siloxane described by formula $$(R_2SiO)_m(RHSiO)_n, \quad (2)$$ 

a mono-α-olefin described by formula $$CH_2=CHR^1, \quad (3)$$ 

and a α,Ω-triene described by formula $$H_2C=CH(CH_2)_2CH=CH(CH_2)_bCH=CH_2, \quad (4)$$ 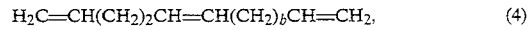

with a platinum catalyst, at a temperature within a range of 50° C. to 200° C., where each R is a radical independently selected from a group consisting of alkyls comprising one to 20 carbon atoms, haloalkyls comprising one to 20 carbon atoms, cycloalkyls comprising four to 20 carbon atoms, aryls, and trialkylsiloxys with each alkyl of the trialkylsiloxys comprising one to 20 carbon atoms, $R^1$ is selected from a group consisting of hydrogen and alkyls of one to 20 carbon atoms, p=0 to 198, q=2 to 200, p+q=2 to 200, m=0 to 18, n=2 to 20, m+n=4 to 20, a=1 to 20, and b=1 to 20; and (B) recovering cross-linked organofunctional polysiloxanes described by formula $$R_3SiO(R_2SiO)_p(RSiO)_x(RSiO)_ySiR_3, \quad (5)$$
$$\qquad\qquad\qquad |\qquad\quad |$$
$$\qquad\qquad\quad (CH_2)_2 \quad AQ$$
$$\qquad\qquad\quad R^1$$

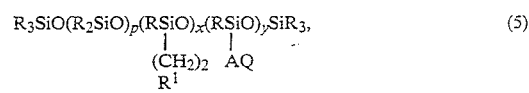

or cross-linked organofunctional cyclosiloxanes described by formula

$$\begin{align}&(R_2SiO)_m(RSiO)_c(RSiO)_d \\ &\qquad\qquad\quad\ \ |\qquad\ \ |\\ &\qquad\qquad\ (CH_2)_2\ \ AQ\\ &\qquad\qquad\quad\ R^1\end{align} \qquad (6)$$

where R, $R^1$, p, and m are as previously described, A is described by formula —$(CH_2)_{a+2}CH$=$CH(CH_2)_{b+2}$—and a and b are as previously described, Q is a silicon atom of another organofunctional polysiloxane or organofunctional cyclosiloxane, x=1 to 199, y=1 to 199, x+y=q, c=1 to 19, d=1 to 19, and c+d=n.

The present process can be run as a continuous process or as a batch process in reactors of standard design. A batch process is preferred. When a homogeneous platinum catalyst is used in the process, the process can be run, for example, in a stirred-tank reactor. When a heterogeneous platinum catalyst is used in the process, the reactor can be, for example, a fixed-bed, a stirred-bed, or a fluidized-bed reactor.

In a typical batch-type process, a mixture is formed in the reactor comprising the mono-α-olefin, the α,Ω-triene, and the platinum catalyst. The poly(organohydrogen)siloxane or cyclo(organohydrogen)siloxane or a mixture thereof is then added to the reactor at a controlled rate to control heat buildup from the resultant exothermic reaction. For purposes of brevity herein, the term (organohydrogen) siloxane is hereafter used as a generic term encompassing both the poly(organohydrogen) siloxane and cyclo(organohydrogen)siloxane and mixtures of the two. In a continuous-type process, a mixture comprising the (organohydrogen) siloxane, mono-α-olefin, and α, Ω-triene can be contacted at a controlled rate with a particulate catalyst bed.

Optimal contact time for the (organohydrogen) siloxane, mono-α-olefin, and α,Ω-triene, in the presence of the platinum catalyst, will depend upon such factors as the nature of the platinum catalyst, the chemical structures of the various reactants, and the temperature at which the process is conducted. In general, contact times of 15 minutes to five hours are considered useful. Contact times of 30 minutes to two hours are preferred. Shorter contact times may be used, but may result in reduced yield of the desired product. Longer contact times may also be used, but to no perceived advantage.

(Organohydrogen)siloxanes which can be reacted in the present process are described by formulas (1) and (2). The (organohydrogen)siloxanes contain substituents R, where each R is a radical independently selected from a group consisting of alkyls of one to 20 carbon atoms, haloalkyls of one to 20 carbon atoms, cycloalkyls of four to 20 carbon atoms, aryls, and trialkylsiloxys. When R is a trialkylsiloxy, each of the alkyl groups can comprise one to 20 carbon atoms. The radical R can be, for example, methyl, ethyl, propyl, isopropyl, tert-butyl, decyl, chloromethyl, 3,3,3 trifluoropropyl, cyclopentyl, cyclohexyl, cyclodecyl, phenyl, tolyl, xylyl, or trimethylsiloxy. Preferred is where R is methyl.

The poly(organohydrogen)siloxane is composed of randomly distributed diorganosiloxy groups of formula $(R_2SiO)_p$ and (organohydrogen)siloxy groups of formula $(RHSiO)_q$, where p can be a value from zero to 198, q can be a value of two to 200, and p+q=2 to 200. It is preferred that the sum of p and q be within a range of about 5 to 100. The optimal ratio of p to q will depend, upon the value of p+q, the degree of cross-linking and organofunctionality required, and the degree of organic compatibility required. In general, it is preferred that p be a value within a range of about 2 to 50. More preferred is when p is a value within a range of about 2 to 10.

The cyclo(organohydrogen)siloxane is composed of randomly distributed diorganosiloxy groups of formula $(R_2SiO)_m$, and (organohydrogen)siloxy groups of formula $(RHSiO)_n$, where m can be a value from zero to 18, n can be a value from 2 to 20, and n+m=4 to 20. Preferred is where m=0 and n=4 to 7.

The mono-α-olefins useful in the present process are described by formula (3), where $R^1$ is selected from a group consisting of hydrogen and alkyls comprising one to 20 carbon atoms. $R^1$ can be, for example, hydrogen, methyl, ethyl, propyl, butyl, and decyl. The mono-α-olefin can be, for example, ethylene, 1-propene, 1-butene, 1-hexene, 1-decene, 1-octadecene, and 1-eicosene, or a mixture thereof.

The α,Ω-trienes useful in the present process are described by formula (4), where both a and b are integers of one to 20. Preferred, is when a and b are integers of two to ten. The α,Ω-triene can be, for example, 1,4,7-octatriene; 1,5,9-decatriene, or 1,6,11-dodecatriene. Generally, the value of a and b in the recovered cross-linked organofunctional polysiloxanes and cyclosiloxanes will be the same value as for the α,Ω-triene. However those skilled in the art will recognize that with some platinum catalysts, the remaining unsaturated bond may be shifted within the carbon chain resulting in different values for a and b in the products.

The mono-α-olefin and α,Ω-triene are added to the process at concentrations such that the reactive terminal unsaturated bonds are present in slight stoichiometric excess in relation to the silicon bonded hydrogen present on the (organohydrogen)siloxanes. By slight stoichiometric excess, it is meant that there is a one percent to ten percent molar excess of terminal unsaturated bonds in relation to the silicon bonded hydrogen present on the (organohydrogen)siloxanes. By terminal unsaturated bonds is meant both the unsaturated bond of the mono-α-olefin and the two terminal unsaturated bonds of the α,Ω-triene.

The mole ratio of the mono-α-olefin to the α,Ω-triene is not critical to the present process and can be varied within wide limits. Generally a mole ratio of about 1.0 to 400 is considered useful. Preferred is a mole ratio of about 2.0 to 10.

The mixture comprising the (organohydrogen)siloxane, mono-α-olefin, and α,Ω-triene is contacted with an effective concentration of a platinum catalyst specific for hydrosilylation of the terminal unsaturated carbon bonds of the α,Ω-triene. The platinum catalyst can be, for example, platinum metal, platinum compounds, or platinum complexes. The platinum catalyst can be, for example, platinum metal, $H_2PtCl_6.6H_2O$, $Pt°\{(CH_2\!\!=\!\!CHMe_2Si)_2O\}_2$, $Pt°\{(CH_2\!\!=\!\!CHMe_2Si)_2O\}(CH_2CH_2CH_3)_2$, $K(C_2H_4PtCl_3)$, $(CH_3CH_2S)_2PtCl_2$, and dichlorobis(ethylene)-μ, μ-dichloroplatinum(II). Preferred is when the platinum catalyst is selected from a group consisting of platinum metal and $H_2PtCl_6.6H_2O$.

The present platinum catalyzed process may be run as either a homogeneous process or as a heterogeneous process. When the process is run as a heterogeneous process, the platinum catalyst may be supported on a solid support material. The solid support material can be any inert material of appropriate size and with the ability to retain the platinum catalyst. The platinum catalyst may be retained on or within the solid support material by standard means, for example, adsorption, ionic bonding, covalent bonding, or physical entrapment. The solid support material may be, for example, carbon, activated carbon, graphite, silica, silicagel, alumina, alumina-silica, and diatomaceous earth. A preferred solid support material is activated carbon. The solid support material can be in the form of particles, powders, flakes, chips, chunks, and pellets.

The size of the solid support material is not critical to the present invention. In general, solid support materials with diameters within a range of about 15 μ to 10 mm are considered useful. The lower size limit is determined principally by the ability to handle and recover the supported platinum catalyst. The upper size limit is determined principally by the ability to provide sufficient surface bound platinum catalyst for the process to run at an economically reasonable rate. A preferred diameter for the solid support material is within a range of about 0.5 mm to 3.0 mm.

The weight of platinum catalyst retained on the solid support can be within a range of about 0.2 to 50 weight percent platinum. Preferred, is widen the weight of platinum catalyst retained on the solid support is within a range of about 0.5 to 5.0 weight percent platinum. The weight percent of platinum on the solid support is calculated as the weight of platinum atoms retained by the solid support divided by the weight of the solid support, the quotient multiplied by 100.

An effective concentration of platinum catalyst in the present process is where the weight of platinum is about 0.0001 to 0.5 percent of the combined weight of the (organohydrogen) siloxane, mono-α-olefin, and α, Ω-triene added to the process. Preferred is where the concentration of platinum is about 0.001 to 0.1 weight percent of the combined weight of (organohydrogen) siloxane, mono-α-olefin, and α, Ω-triene added to the process.

The present process can be conducted at a temperature within a range of about 50° C. to 200° C. A preferred temperature for conducting the process is within a range of about 65° C. to 170° C. The preferred method for conducting the present process is by refluxing the reaction mixture at a temperature within a range of about 65° C. to 170° C.

To facilitate refluxing within the preferred temperature range, an inert organic solvent may be added to the process. Any organic solvent which is inert in the present process and has a boiling point within a range of about 50° C. to 200° C. may be used for this purpose. The organic solvent can be, for example, hexane, heptane, benzene, and toluene. The organic solvent may be present in the process within a weight range of about one to 30 weight percent of the combined weight of the (organohydrogen)siloxane, mono-α-olefin, and α,Ω-triene added to the process. Preferred is when the organic solvent is present in the process within a weight range of about five to ten weight percent of the combined weight of the (Organohydrogen)siloxane, mono-α-olefin, and α,Ω-triene added to the process.

Recovery of cross-linked organofunctional polysiloxanes and cyclosiloxanes can be accomplished by standard means, for example, the products can be vacuum stripped, distilled, filtered, or any combination thereof. Recovery of the products may include retaining or using the products without further processing.

The recovered cross-linked organofunctional polysiloxanes and cyclosiloxanes are compatible in oils and waxes and can be used as additives to improve the slide properties of, for example, textile fiber. They can also be included internally in organic polymer materials to improve both processing and finishing properties.

The following examples are provided to illustrate the present invention. These examples are not intended to limit the scope of the claims provided herein.

EXAMPLE 1

Into a 200 ml round-bottom flask was added 39.1 g of 1-octadecene, 3.5 g of 1 5,9-decatriene, 5 g of hexane and 1.5 g of 0.5% platinum on carbon catalyst. The platinum on carbon catalyst was purchased from Engelhard (Newark, N.J.) and consisted of 0.5% w/w of platinum on 4 ×8 mesh activated carbon particles. The temperature of the formed mixture was raised to 95° C. and 11.3 g of 1,3,5,7tetramethyltetracyclosiloxane, (MeHSiO)$_4$, was slowly added to the mixture. The resulting exothermic reaction raised the temperature of the mixture to about 130° C. The mixture was allowed to set and cool for about 16 hours. The cooled mixture was stripped of volatiles by heating at 175° C. under vacuum. A total of 45.7 g of a white, waxy product was collected. The product had a melting point of 38° C. Analysis of the product by Fourier transform infrared spectroscopy (FTIR) showed little SiH present as evidenced by a small absorption band between 2100–2200 cm$^{-1}$, no α,Ω-triene terminal olefinic bonds as evidence by the absence of an absorption band at 993 and 911 cm$^{-1}$, and intact olefinic bonds within the α,Ω-triene as evidenced by the adsorption band at 968–963 cm$^{-1}$.

EXAMPLE 2

Into a 200 ml round bottom flask was added 68.0 g of 1-hexene, 20.1 g of 1,5,9-decatriene, and 1.5 g of 0.5% platinum on carbon catalyst as previously described. The mixture was heated to 70° C. and 64.8 g of 1,3,5,7tetramethyltetracyclosiloxane was slowly added to the mixture. The resulting exothermic reaction raised the temperature of the mixture to about 95° C. After complete addition, the mixture was heated for one hour at 110°–130° C. The resultant mixture was stripped under vacuum at 150° C. A total of 143 g of product fluid was recovered. The product fluid had a viscosity of 71.0 centistoke, a density of 0.93 g/mL, and a refractive index of 1.4485. FTIR analysis, as described in example 1, of the product fluid showed an absence of SiH and α,Ω-triene terminal olefinic bonds, with the α,Ω-triene internal olefinic bond left intact.

EXAMPLE 3

Into a 200 mL round-bottom flask was added 70.6 g of 1-hexene, 15.6 g of 1,5,9-decatriene, and 1.5 g of 0.5% platinum on carbon catalyst as previously described. The mixture was heated to 68° C. and then 63.0 g of 1,3,5,7,9-pentamethylpentacyclosiloxane, (HMeSiO)$_5$, was slowly added to the mixture. External heat was supplied to the mixture for the first 20 minutes of addition to keep the temperature at about 68° C., but then an exothermic reaction commenced which caused the temperature to rise to about 107° C. following complete addition. The product mixture was further heated at 120° C. to 130° C. for one hour, then at 150° C. for 30 minutes. The product mixture was vacuum stripped at 100° C. A total of 127 g of a product fluid was recovered having a viscosity of 12,600 centistoke, density of 31 g/mL, and refractory index of 1.4486. FTIR analysis, as described in example 1, of the product fluid showed the presence of a minor amount of SiH, an absence of α,Ω-triene terminal olefinic bonds, and intact α,Ω-triene internal olefinic bonds.

EXAMPLE 4

Into a 200 mL round-bottom flask was added 24.6 g of 1-hexene, 5.0 g of 1,5,9-decatriene, and 7.3 g of Me$_3$SiO(Me$_2$SiO)$_3$(HMeSiO)$_5$SiMe$_3$. The mixture was heated to 65° C. and an additional 42.7 g of Me$_3$SiO(Me$_2$SiO)$_3$(HMeSiO)$_5$SiMe$_3$ was slowly added to the mixture. During addition, the temperature increased to 125° C. The mixture was heated at 140° C. to 160° C. for one hour. An initial analysis by FTIR showed the presence of residual SiH, therefore 5% excess hexene was added and the mixture heated for an additional hour at 150° C. The resultant product was stripped of volatiles under vacuum at a temperature of 150° C. A total of 73.6 g of product fluid was recovered having a viscosity of 305 centistoke, refractory index of 1.4323, and density of 0.93 g/mL. FTIR analysis, as described in example 1, of the product fluid showed the presence of a minor amount of SiH, an absence of α,Ω-triene terminal olefinic bonds, and intact α,Ω-triene internal olefinic bonds.

EXAMPLE 5

Into a 100 mL round-bottom flask was placed 22.4 g of Me$_3$SiO(HMeSiO)$_{72}$SiMe$_3$(siloxane). A mixture comprising 27,0 g of hexene and 3.31 mg of H$_2$PtCl$_6$.6H$_2$O was formed (hexene mixture). The siloxane was heated to 70° C. and then about 90% of the hexene mixture was slowly added to the siloxane, maintaining the temperature within a range of 125° C. to 140° C. To the remaining 10% of the hexene mixture was added 0.13 g of 1,5,9-decatriene and the remainder of the hexene mixture was slowly added to the siloxane. The resultant product was heated at 150° C. for one hour. A preliminary FTIR analysis showed the presence of a small amount of SiH in the product. Therefore, 30 ml of toluene and an additional 5.2 g of hexene was added to the product and this mixture heated at 150° C. for one hour. The resultant product was vacuum stripped of volatiles at 110° C. A total of 47.5 g of product having a gel like consistency was recovered. FTIR analysis, as described in example 1, of the product fluid showed an absence of SiH and of α,Ω-triene terminal olefinic bonds, and intact α,Ω-triene internal olefinic bonds.

I claim:

1. A process for the preparation of cross-linked organofunctional polysiloxanes, the process comprising:
   (A) contacting a mixture comprising a poly(organohydrogen)siloxane described by formula R$_3$SiO(R$_2$SiO)$_p$(RHSiO)$_q$SiR$_3$, a mono-α-olefin described by formula

CH$_2$=CHR$^1$, and a α,Ω-triene described by formula

H$_2$C=CH(CH$_2$)$_a$CH=CH(CH$_2$)$_b$CH=CH$_2$, with a platinum catalyst, at a temperature within a range of 50° C. to 200° C., where each R is a radical independently selected from a group consisting of alkyls comprising one to 20 carbon atoms, haloalkyls comprising one to 20 carbon atoms, cycloalkyls comprising four to 20 carbon atoms, aryls, and trialkylsiloxys with each alkyl of the trialkylsiloxys comprising one to 20 carbon atoms, R$^1$ is selected from a group consisting of hydrogen and alkyls comprising one to 20 carbon atoms, p=0 to 198, q=2 to 200, p+q=2 to 200, a=1 to 20, and b=1 to 20; and (B) recovering cross-linked organofunctional polysiloxanes described by formula R$_3$SiO(R$_2$SiO)$_p$(RSiO)$_x$(RSiO)$_y$SiR$_3$
                               |      |
                             (CH$_2$)$_2$ AQ
                             R$^1$ where R, R$^1$, and p are as previously described, A is describe by formula —(CH$_2$)$_{a+2}$CH=CH(CH$_2$)$_{b+2}$— and a and b are as previously described, Q is a silicon atom of another organofunctional polysiloxane, x=1 to 199, y=1 to 199, and x+y=q.

2. A process according to claim 1, where contacting the mixture with the platinum catalyst is for a contact time of 30 minutes to two hours.

3. A process according to claim 1, where R is methyl.

4. A process according to claim 1, where p is a value within a range of about 2 to 10 and p+q=5 to 100.

5. A process according to claim 1, where a=2 to 10 and b=2 to 10.

6. A process according to claim 1, where the mole ratio of the mono-α-olefin to the α,Ω-triene is within a range of about 2.0 to 10.

7. A process according to claim 1, where the platinum catalyst is selected from a group consisting of platinum metal and H$_2$PtCl$_6$.6H$_2$O.

8. A process according to claim 1, where the platinum catalyst is supported on a solid support.

9. A process according to claim 1, where the platinum catalyst is platinum metal supported on activated carbon.

10. A process according to claim 1, where the platinum catalyst is present at a platinum concentration of about 0.001 to 0.1 weight percent of the combined weight of the poly(organohydrogen)siloxane, mono-α-olefin, and α,Ω-triene added to the process.

11. A process according to claim 1, where the temperature is within a range of about 65° C. to 170° C.

12. A process according to claim 1, where an inert organic solvent having a boiling point within a range of about 50° C. to 200° C. is present in the process.

13. A composition comprising cross-linked organofunctional polysiloxanes described by formula R$_3$SiO(R$_2$SiO)$_p$(RSiO)$_x$(RSiO)$_y$SiR$_3$,
                          |      |
                        (CH$_2$)$_2$ AQ
                        R$^1$ where each R is a radical independently selected from a group consisting of alkyls comprising one to 20 carbon atoms, haloalkyls comprising one to 20 carbon atoms, cycloalkyls comprising four to 20 carbon atoms, aryls, and trialkylsiloxys with each alkyl of the trialkylsiloxys comprising one to 20 carbon atoms, R$^1$ is selected from a group consisting of hydrogen and alkyls comprising one to 20 carbon atoms, A is described by formula —$(CH_2)_{a+2}CH=CH(CH_2)_{b+2}$—, Q is a silicon atom of another organofunctional polysiloxane, p=0 to 198, x=1 to 199, y=1 to 199, p+x+y=2 to 200, a=1 to 20, and b=1 to 20.

14. A composition according to claim 13, where R is methyl, p=2 to 10, and p+x+y=5 to 100.

15. A composition according to claim 14, where $R^1$ is butyl.

16. A process for the preparation of cross-linked organofunctional cyclosiloxanes, the process comprising:

(A) contacting a mixture comprising a cyclo(organohydrogen) siloxane described by formula $(R_2SiO)_m(RHSiO)_n$, a mono-α-olefin described by formula $CH_2=CHR^1$, and a α,Ω-triene described by formula $H_2C=CH(CH_2)_aCH=CH(CH_2)_bCH=CH_2$, with a platinum catalyst, at a temperature within a range of 50° C. to 200° C., where each R is a radical independently selected from a group consisting of alkyls comprising one to 20 carbon atoms, haloalkyls comprising one to 20 carbon atoms, cycloalkyls comprising four to 20 carbon atoms, aryls, and trialkylsiloxys with each alkyl of the trialkylsiloxys comprising one to 20 carbon atoms, $R^1$ is selected from a group consisting of hydrogen and alkyls comprising one to 20 carbon atoms m=0 to 18, n=2 to 20, m+n=4 to 20, a=1 to 20, and b=1 to 20; and B) recovering cross-linked organofunctional cyclosiloxanes described by formula $(R_2SiO)_m(RSiO)_c(RSiO)_d$
$\phantom{(R_2SiO)_m}|\phantom{(RSiO)_c}|$
$\phantom{(R_2SiO)_m}(CH_2)_2 \phantom{xx} AQ$
$\phantom{(R_2SiO)_m}R^1$ where R, $R^1$, and m are as previously described, A is described by formula —$(CH_2)_{a+2}CH=CH(CH_2)_{b+2}$— and a and b are as previously described, Q is a silicon atom of another organofunctional cyclosiloxane, c=1 to 19, d=1 to 19, and c+d=n.

17. A process according to claim 16, where contacting the mixture with the platinum catalyst is for a contact time of 30 minutes to two hours.

18. A process according to claim 16, where R is methyl.

19. A process according to claim 16, where m=0 and n=4 to 7.

20. A process according to claim 16, where the mole ratio of the mono-α-olefin to the α,Ω-triene is within a range of about 2.0 to 10.

21. A process according to claim 16, where the platinum catalyst is selected from a group consisting of platinum metal and $H_2PtCl_6.6H_2O$.

22. A process according to claim 16, where the platinum catalyst is supported on a solid support.

23. A process according to claim 16, where the platinum catalyst is platinum metal supported on activated carbon.

24. A process according to claim 16, where the platinum catalyst is present at a platinum concentration of about 0.001 to 0.1 weight percent of the combined weight of the cyclo(organohydrogen)siloxane, mono-α-olefin, and α,Ω-triene added to the process.

25. A process according to claim 16, where the temperature is within a range of about 65° C. to 170° C.

26. A process according to claim 16, where an inert organic solvent having a boiling point within a range of about 50° C. to 200° C. is present in the process.

27. A process according to claim 16, where a=2 to 10 and b=2 to 10.

28. A composition comprising cross-linked organofunctional cyclosiloxanes described by formula $(R_2SiO)_m(RSiO)_c(RSiO)_d$
$\phantom{(R_2SiO)_m}|\phantom{(RSiO)_c}|$
$\phantom{(R_2SiO)_m}(CH_2)_2 \phantom{xx} AQ$
$\phantom{(R_2SiO)_m}R^1$ where each R is a radical independently selected from a group consisting of alkyls comprising one to 20 carbon atoms, haloalkyls comprising one to 20 carbon atoms, cycloalkyls comprising four to 20 carbon atoms, aryls, and trialkylsiloxys with each alkyl of the trialkylsiloxys comprising one to 20 carbon atoms, $R^1$ is selected from a group consisting of hydrogen and alkyls comprising one to 20 carbon atoms, A is described by formula —$(CH_2)_{a+2}CH=CH(CH_2)_{b+2}$—, Q is a silicon atom of another organofunctional cyclosiloxane, m=0 to 18, c=1 to 19, d=1 to 19, m+c+d=4 to 20, a=1 to 20, and b=1 to 20.

29. A composition according to claim 27, where R is methyl, m=0 and c+d=4 to 7.

30. A composition according to claim 28, where $R^1$ is butyl.

* * * * *